United States Patent
Yun

(10) Patent No.: US 7,145,615 B2
(45) Date of Patent: Dec. 5, 2006

(54) REFLECTIVE LCD HAVING FIRST PATTERN AND SECOND PATTERN DIFFERENT FROM EACH OTHER

(75) Inventor: Young-Nam Yun, Seoul (KR)

(73) Assignee: Samsung Electronics Co., Ltd. (KR)

( * ) Notice: Subject to any disclaimer, the term of this patent is extended or adjusted under 35 U.S.C. 154(b) by 8 days.

(21) Appl. No.: 10/732,391

(22) Filed: Dec. 9, 2003

(65) Prior Publication Data

US 2004/0141113 A1    Jul. 22, 2004

(30) Foreign Application Priority Data

Dec. 13, 2002  (KR) .................. 10-2002-0079549

(51) Int. Cl.
*G02F 1/1335* (2006.01)
(52) U.S. Cl. .................. 349/113; 349/114; 349/138
(58) Field of Classification Search ................ 349/113, 349/114, 138
See application file for complete search history.

(56) References Cited

U.S. PATENT DOCUMENTS

| | | | |
|---|---|---|---|
| 4,431,272 A | 2/1984 | Yazawa et al. | 350/336 |
| 5,408,345 A * | 4/1995 | Mitsui et al. | 349/42 |
| 5,418,635 A | 5/1995 | Mitsui et al. | 359/70 |
| 6,262,783 B1 * | 7/2001 | Tsuda et al. | 349/39 |
| 6,459,463 B1 * | 10/2002 | Kim et al. | 349/113 |
| 2002/0118324 A1 * | 8/2002 | Tsuyuki et al. | 349/113 |
| 2002/0118326 A1 * | 8/2002 | Sakamoto et al. | 349/113 |
| 2003/0030768 A1 * | 2/2003 | Sakamoto et al. | 349/113 |
| 2003/0048399 A1 * | 3/2003 | Okumura | 349/113 |
| 2004/0196419 A1 * | 10/2004 | Kanou et al | 349/113 |

FOREIGN PATENT DOCUMENTS

JP    2002 031797    1/2002

* cited by examiner

*Primary Examiner*—David Nelms
*Assistant Examiner*—(Nancy) Thanh-Nhan P Nguyen
(74) *Attorney, Agent, or Firm*—MacPherson, Kwok, Chen & Heid LLP

(57) ABSTRACT

Disclosed are LCD devices with improved display quality and front luminance and a method of manufacturing these LCD devices. Signal lines for transmitting the driving signals and TFTs are formed on the transparent substrate, and a dielectric layer is deposited on the transparent substrate. A leakage current prevention pattern is formed on a first region of the dielectric layer that overlies signal lines and the TFTs. A luminance-increasing pattern is formed on a second region of the dielectric layer that is separate from the first region. The thickness of the dielectric layer is higher at the leakage current prevention pattern than the luminance-increasing pattern, on the average. The leakage current prevention pattern has protrusions (e.g., convex portions or polygonal cones) of different dimensions. Accordingly, the leakage current can be prevented and the luminance of the LCD device can be improved.

20 Claims, 13 Drawing Sheets

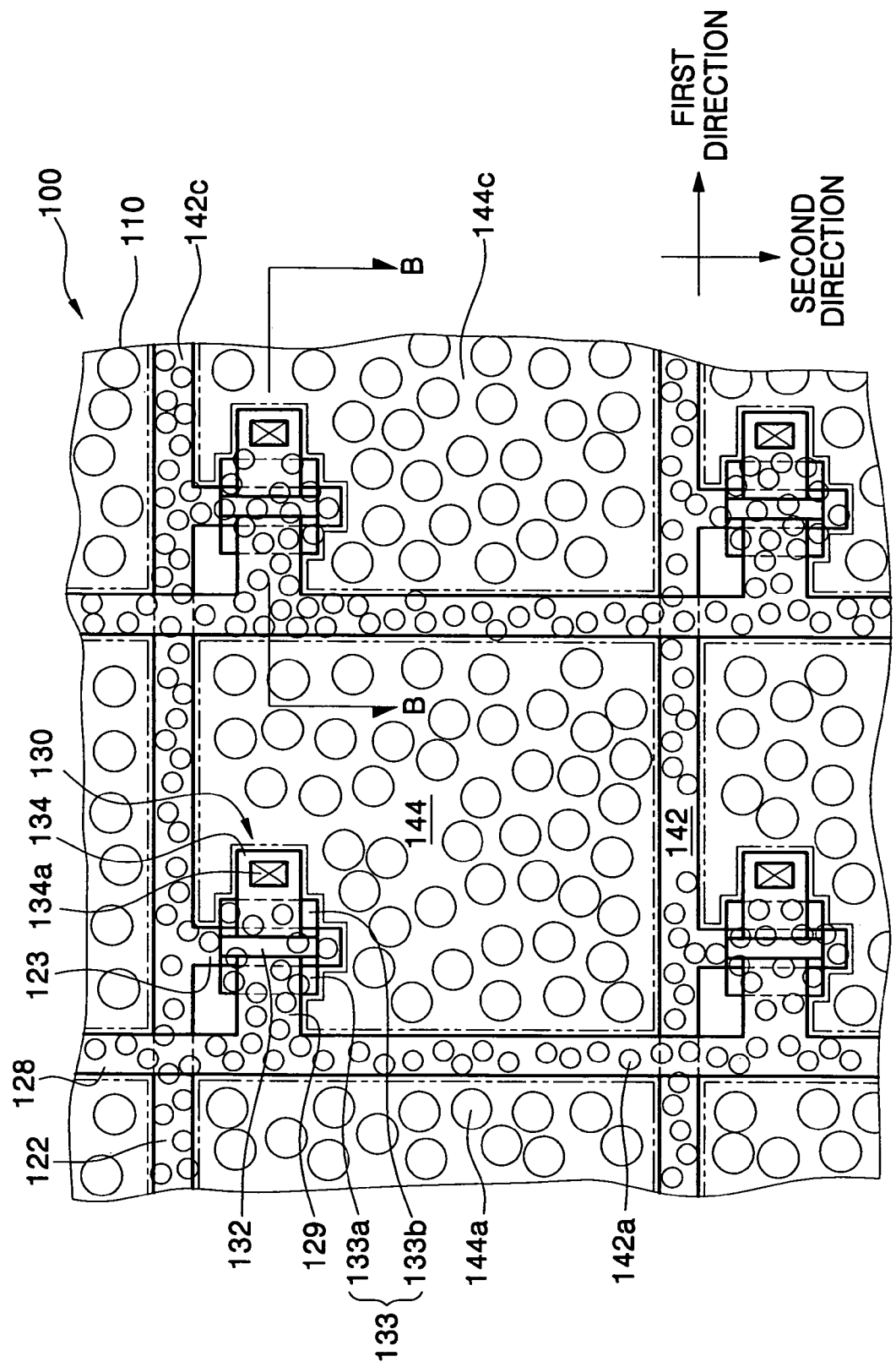

REFLECTIVE LCD HAVING FIRST PATTERN AND SECOND PATTERN DIFFERENT FROM EACH OTHER

CROSS-REFERENCE OF RELATED APPLICATIONS

This application relies for priority upon Korean Patent Application No. 2002-79549 filed on Dec. 13, 2002, the contents of which are herein incorporated by reference in their entirety.

BACKGROUND OF THE INVENTION

1. Field of the Invention

The invention relates to display devices. More particularly, the invention relates to liquid crystal display devices with improved display quality and luminance, and a method for fabricating the same.

2. Description of the Related Art

A liquid crystal display (hereinafter referred to as "LCD") device is a type of flat panel display device. Like most flat panel display devices, LCD devices are smaller and lighter than cathode-ray tube (CRT) display devices of a comparable screen size. The smaller size and lower weight make flat panel displays advantageous in various applications.

LCD devices display information such as characters, images, and moving pictures, by using the optical properties of liquid crystal molecules. An electric field, which forms in the layer of liquid crystal molecules in response to voltage, changes the arrangement and/or the orientation of the liquid crystal molecules. This change in arrangement and/or orientation of the liquid crystal molecules, in turn, affects the transmissivity of light through the liquid crystal layer. Since the liquid crystal itself does not emit light, the LCD device requires a light source to display an image. Accordingly, the LCD device sometimes employs a separate light source.

The LCD device is classified into three categories: a transmissive type LCD device, a reflective type LCD device, and a transmissive-reflective type LCD device.

A transmissive type LCD device uses an internal light source for displaying an image. Thus, in transmissive type LCD devices, light that is generated by application of electrical power to a light source is provided to the liquid crystal layer for displaying information on a screen of the LCD device. In contrast, a reflective type LCD device uses light from a light source that is external to the LCD device. This external light source may be, for example, natural light such as sunlight or an artificial light such as light illuminated from a lamp. A transmissive-reflective type LCD device uses both an internal light source and an external light source for displaying an image. Typically, the transmissive-reflective type LCD device uses the internal light source when there is insufficient amount of external light and uses external light when there is a sufficient amount of it.

Both the reflective type and the transmissive-reflective type LCD devices include a reflective electrode to reflect the light from an external light source, thereby displaying images. Therefore, enlarging the reflective surface of the reflective electrode usually improves the front luminance of these LCD devices.

When the surface area of the reflective electrodes is maximized, the non-reflective area between the reflective electrodes decreases in the reflective type or the transmissive-reflective type LCD device. Recently, LCD devices have been made with reflective electrodes disposed on a signal line, wherein an electric power of a predetermined voltage is applied to the signal line. The reflective electrodes being disposed on the signal line is an advantage of the reflective type or the transmissive-reflective type LCD devices.

However, the reflective type or the transmissive-reflective type LCD device also suffers from a disadvantage that lowers the display quality. The reflective electrode disposed on the signal lines must be electrically isolated from the reflective signal lines. To achieve this electrical separation, an organic insulating layer having a dielectric constant of about 3.3 is interposed between the reflective electrode and the signal line. The surface of the insulating layer is generally patterned to direct light such that the front luminance is improved. Overall, the improvement in front luminance is due to an increase in the surface area through which the light passes, and the attendant increase in light diffusion. Since this improved luminance stems from the increased surface area of the reflective electrode, which in turn is made possible by the presence of the insulating layer, the insulating layer significantly affects the display quality of a reflective type or a transmissive-reflective type LCD device.

Generally, it is desirable to make the insulating layer thin because a thin insulating layer facilitates formation of contact holes and light transmission. However, when the insulating layer is too thin, a parasitic capacitor may form between the conductive signal line and the non-conductive insulating layer, and between the non-conductive insulating layer and the conductive reflective electrode. This formation of the parasitic capacitor is undesirable, as it distorts an electrical signal applied through the signal line and modifies the voltage applied to the reflective electrode. Ultimately, the parasitic capacitor deteriorates the display quality of the LCD device.

To reduce the parasitic capacitance, the thickness of the insulating layer can be increased. However, this thickening of the insulating layer adversely affects light transmission, as discussed above. Although parasitic capacitance can be reduced without thickening the insulating layer if the reflective electrode is not formed over the signal lines, this solution also has the undesired effect of reducing the reflective surface area of the reflective electrode, thereby still decreasing the luminance of the LCD device. Accordingly, every option has a disadvantage. Thus, there continues to be a need for novel structures of the LCD device and manufacturing methods that can improve the front luminance of an LCD device.

SUMMARY OF THE INVENTION

Accordingly, the invention is directed to an LCD device that substantially obviates one or more of the problems stemming from the limitations and disadvantages of the related art. The present invention provides an LCD device with improved light reflectance, reduced parasitic capacitance, and uncompromised light transmission, all of which improve display quality. The present invention also provides a method of manufacturing this LCD device.

The invention is a display device that includes a first substrate having a first region and a second region and a dielectric layer deposited on the first and the second regions. The dielectric layer of the first region has a first pattern and the dielectric layer of the second region has a second pattern that is different from the first pattern. A second substrate is coupled to the first substrate to form a space between the second substrate and the dielectric layer and a liquid crystal layer is positioned in the space.

In another aspect, the invention is a display device including a first substrate, an electrically conductive region formed on the first substrate, wherein the electrically conductive region includes signal lines and transistors, and a dielectric material deposited on the first substrate and the electrically conductive region. The surface of the dielectric material has a surface pattern of bumpy portions that are spaced apart at a regular interval, wherein the interval depends on a desired thickness of the dielectric material. A first electrode is deposited on the dielectric material. The first electrode has an electrode pattern that substantially matches the surface pattern. A second electrode is coupled to the first electrode and a liquid crystal layer is positioned between the first and the second electrodes.

In yet another aspect, the invention is a display device including a substrate having a plurality of regions and a dielectric layer deposited on the plurality of regions, wherein a surface of the dielectric layer in each of the plurality of regions has a unique pattern.

The invention also includes a method of making a display device with improved luminance. The method includes obtaining a first member having a first region and a second region, depositing a dielectric layer on the first region and the second region, patterning the dielectric layer overlying the first region to form a first patterned region, and pattering the dielectric layer overlying the second region to form a second patterned region having a pattern different from the first patterned region. A second member is attached to the first member to form a space between the second member and the dielectric layer and a liquid crystal layer is deposited in the space.

BRIEF DESCRIPTION OF THE DRAWINGS

The above and other objects and advantages of the present invention will become readily apparent by reference to the following detailed description when considered in conjunction with the accompanying drawings, in which:

FIG. 5A is a plan view showing a leakage current prevention pattern and a luminance-increasing pattern according to a first exemplary embodiment of the present invention;

DESCRIPTION OF THE PREFERRED EMBODIMENTS

The present invention now will be described more fully hereinafter with reference to the accompanying drawings, in which exemplary embodiments of the present invention are shown. This invention may, however, be embodied in many different forms and should not be construed as limited to the embodiments set forth herein. As an exemplary embodiment, the present invention discloses a reflective LCD device including signal lines, a dielectric layer, and a reflective layer. However, the sprit and scope of the present invention should not be limited to the reflective type LCD, as would be apparent to a person of ordinary skill in the art.

As used herein, "coupled to" or "coupled with" indicates any direct or indirect connection. Likewise, when one material is "deposited on" another material, the two materials could be positioned adjacent to each other or separated by intermediate layers. A "thickness" of a dielectric layer is a thickness of the dielectric layer measured in a direction that is substantially perpendicular to the surface of a substrate. The thickness of a dielectric layer includes the thickness of any pattern on the surface of the dielectric layer.

A "pattern" is any form of regular and/or irregular pattern having a bumpy portion and a dip portion. A "bumpy portion," as used herein, refers to any portion in the pattern having a local thickness greater than the mean thickness of the layer in the relevant region. A "dip portion," as used herein, refers to any portion in the pattern having a local thickness that is less than or equal to the mean thickness of the dielectric layer in the relevant region. The "height" of a patterned portion refers to the distance between the bottom of a nearest dip portion and the top of a nearest bumpy portion. A "repetition frequency," which only applies to a regular pattern, indicates the number of bumpy portions in a given amount of surface area. An "interval" refers to the distance between two bumpy portions, measured between the corresponding physical portions of the two bumpy portions.

Exemplary Embodiments of an LCD Device

Embodiment 1

Figure 1:
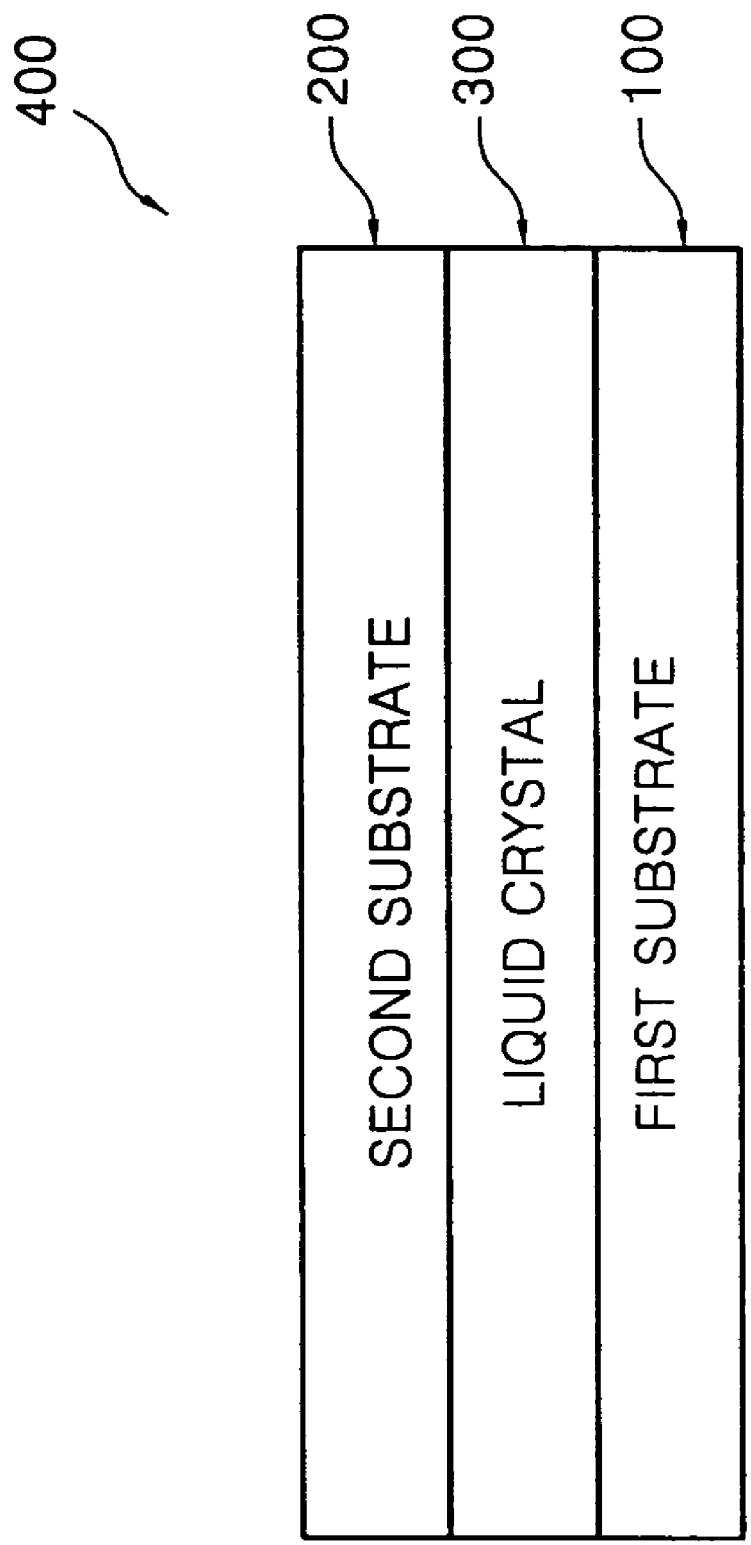
FIG. 1 is a conceptual view showing an LCD device according to a first exemplary embodiment of the present invention.
Figure 2:
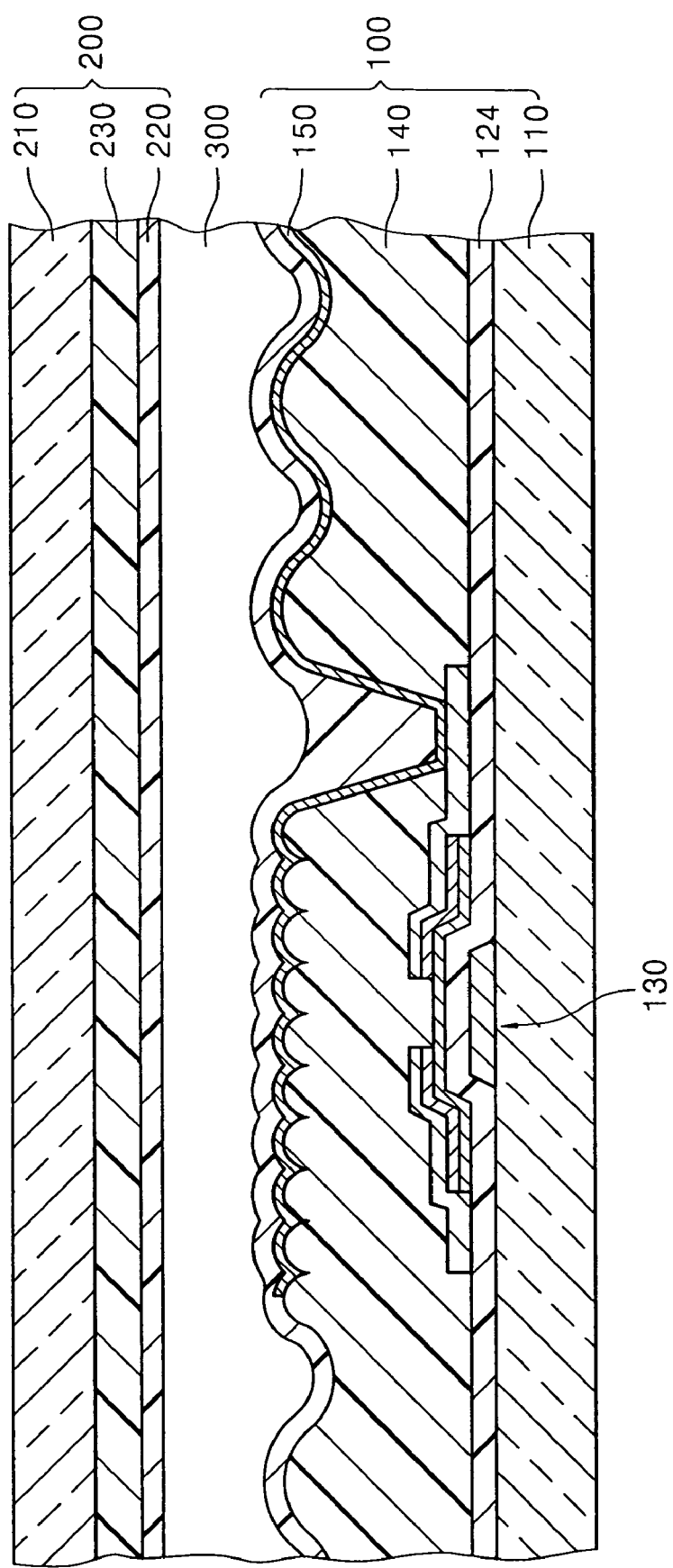
FIG. 2 is a cross-sectional view showing an inside of the LCD device shown in FIG. 1.
Figure 3:
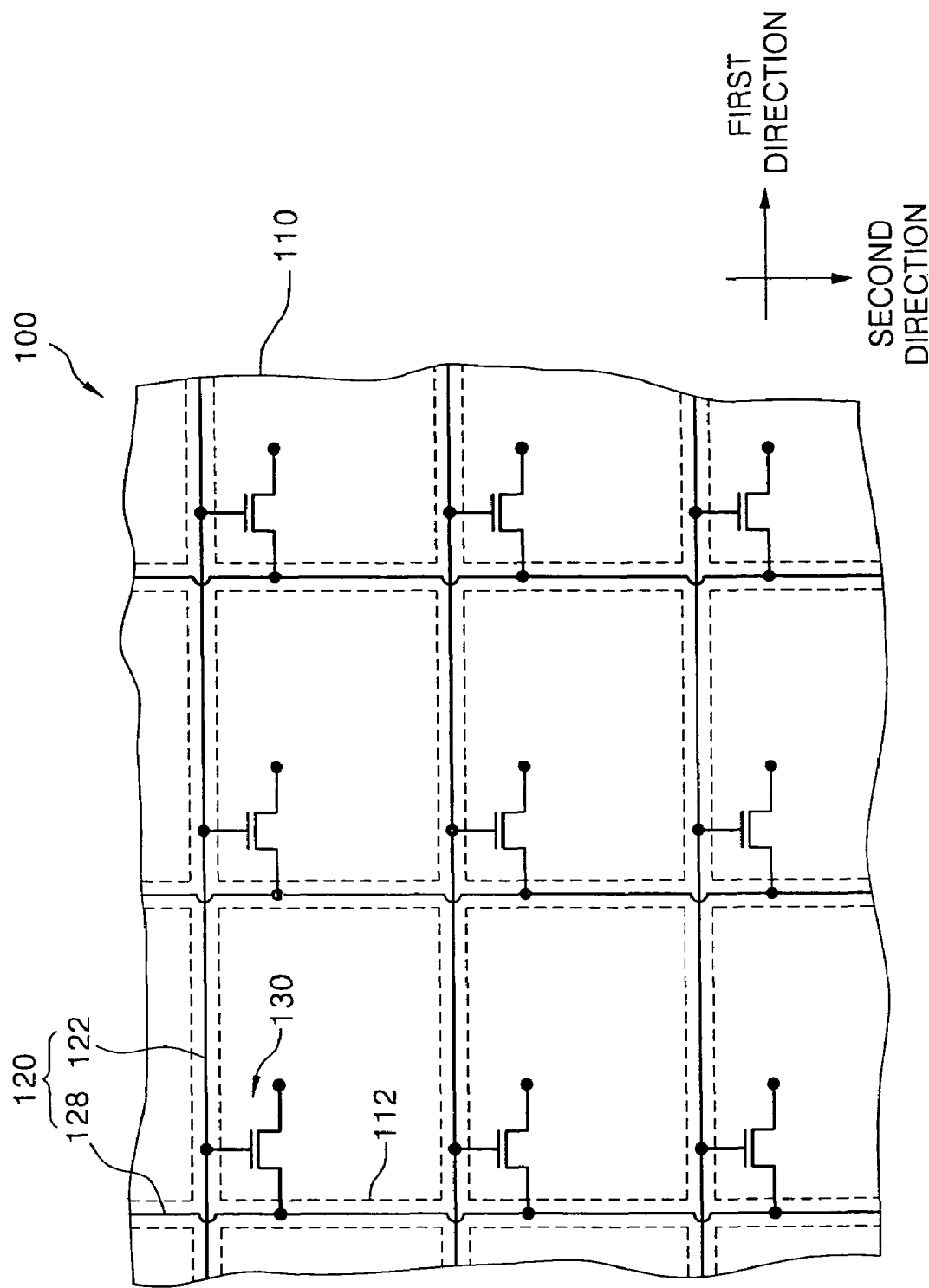
FIG. 3 is a conceptual view showing a first member shown in FIG.1.

FIG. 1 is a conceptual view showing an LCD device according to a first exemplary embodiment of the present invention, and FIG. 2 is a cross-sectional view showing an inside of the LCD device shown in FIG. 1. FIG. 3 is a conceptual view of the first member shown in FIG. 1.

Referring to FIG. 1, the LCD device 400 includes a first member 100, a liquid crystal layer 300, and a second member 200. The first member 100 and the second member 200 are separated by a predetermined distance, sandwiching the liquid crystal layer 300. As shown in FIGS. 2 and 3, the first member 100 includes a first substrate 110, a plurality of signal lines 120, a thin film transistor (hereinafter, referred to as TFT) 130, a dielectric layer 140, and a first electrode 150. The second member 200 includes a second substrate 210, a second electrode 220, and a color filter 230.

The first substrate 110 includes a transparent material. In one embodiment, the first substrate 110 is a glass substrate having a high transmissivity. The signal lines 120 are disposed on the first substrate 110, and first and second driving signals are applied thereto from an external electric power source. The first driving signal is a timing signal and the second driving signal is a data signal including information. The signal lines 120 to which the first and second driving signals are applied are disposed in different directions with respect to each other but in a way that they will not be electrically shorted.

In the embodiment that is shown, the signal lines 120 include first signal lines 122 and second signal lines 128 that are arranged substantially perpendicular to each other but without being electrically coupled. The first signal lines 122 extend in a first direction on the first substrate 110, and the first driving signal is applied to the first signal lines 122. The second signal lines 128 extend in a second direction perpendicular to the first direction on the first substrate 110, and the second driving signal is applied to the second signal lines 128.

It is well known that the number of signal lines correlates with the size and the resolution of the display screen. For example, when the LCD device has a diagonal length of 19 inches and a resolution of 1024×768 pixels, and displays a full-color image, the first signal lines 122 includes 768 sub-lines, and the second signal lines 128 includes 3072 sub-lines, which is equivalent to 1024×3.

Figure 4:
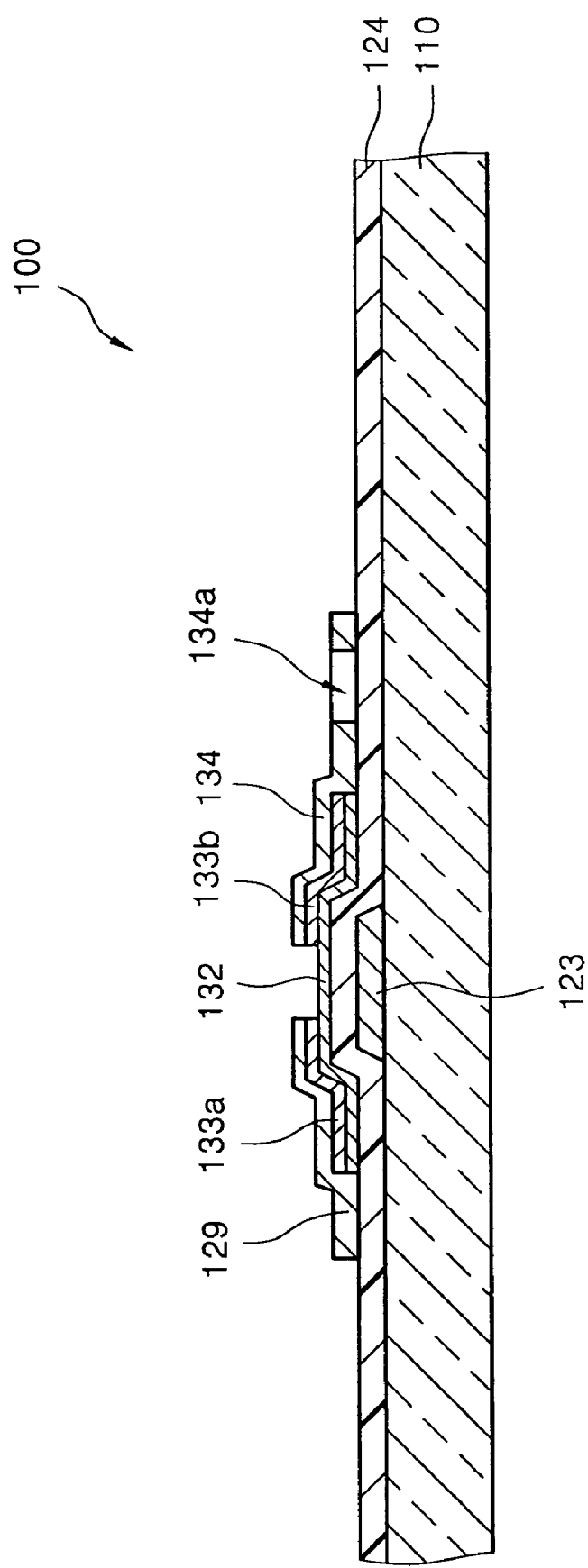
FIG. 4 is a cross sectional view showing a thin film transistor shown in FIG. 2.

FIG. 4 is a cross sectional view of a thin film transistor shown in FIG. 2.

Referring to FIGS. 2 and 4, a TFT 130 is formed at a pixel 112. The boundaries of a pixel are approximately delineated by the first signal lines 122 and the second signal lines 128. The TFT 130 includes a gate electrode 123, an insulating layer 124, a channel region 131, a source electrode 129, and a drain electrode 134.

The first signal lines extend in the first direction to form the gate electrode 123 at the pixel 112. The insulating layer 124 is formed on the entire surface of the first substrate 110, thereby insulating the gate electrode 123.

The channel region 131 (see FIG. 11) is disposed over the gate electrode 123 at every pixel 112, and includes an amorphous silicon thin film 132, a first n$^+$ amorphous silicon thin film 133a and a second n$^+$ amorphous silicon thin film 133b. The amorphous silicon thin film 132 is disposed on a portion of the insulating layer covering the gate electrode 123, and the first n$^+$ amorphous silicon thin film 133a and the second n$^+$ amorphous silicon thin film 133b are disposed on a surface of the amorphous silicon thin film 132.

Figure 12:
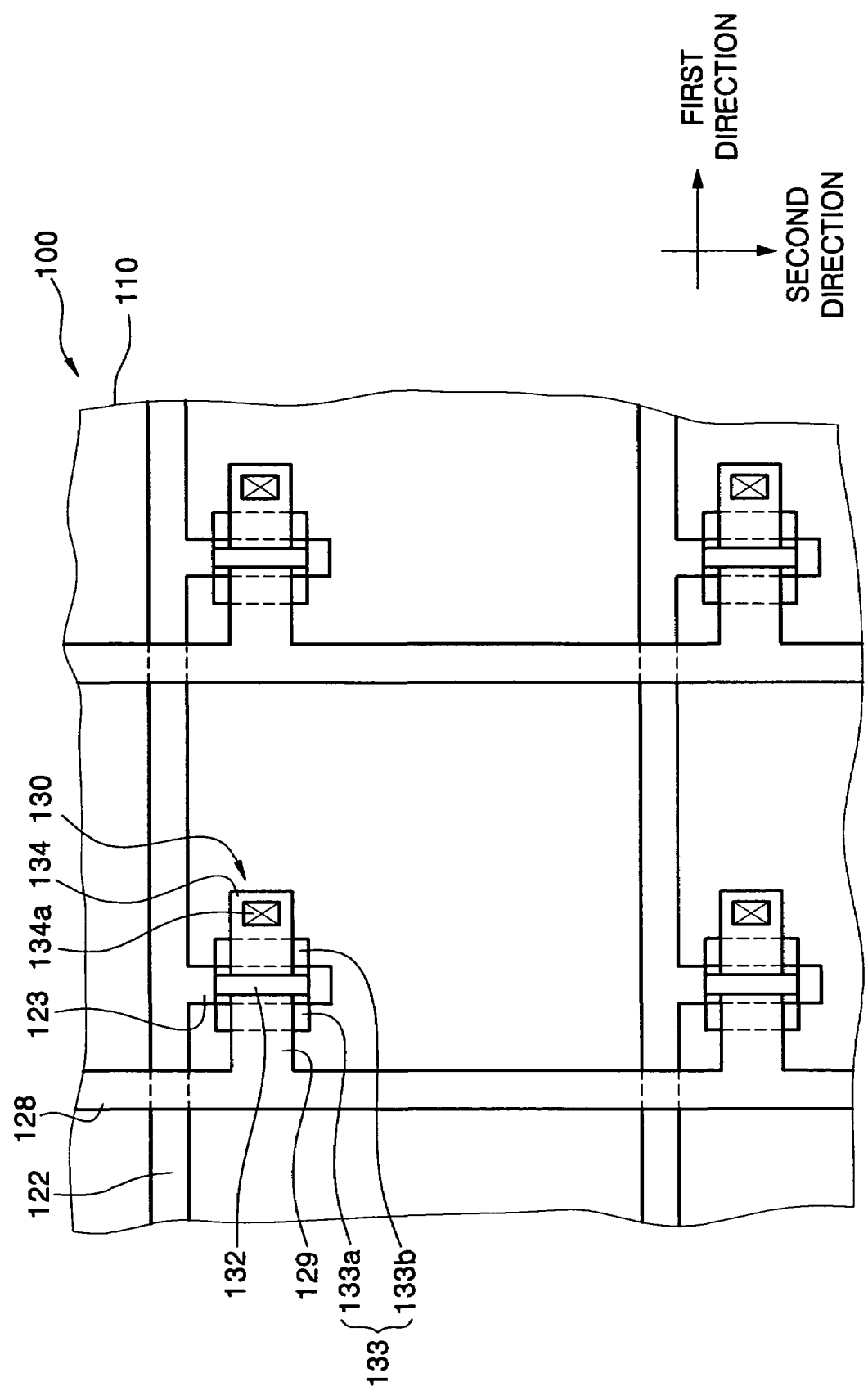
FIG. 12 is a view showing a second signal line, a source electrode and a drain electrode formed on a first member of the LCD device according to an exemplary embodiment of the present invention.

The second signal lines 128, which generally extend in the second direction, has a segment that extends in the first direction to form the source electrode 129 (see FIG. 12). The source electrode 129 makes contact with the first n$^+$ amorphous silicon thin film 133a, and the drain electrode 134 makes contact with the second n$^+$ amorphous silicon thin film 133b. The drain electrode 134 includes a first contact hole 134a.

Figure 5B:
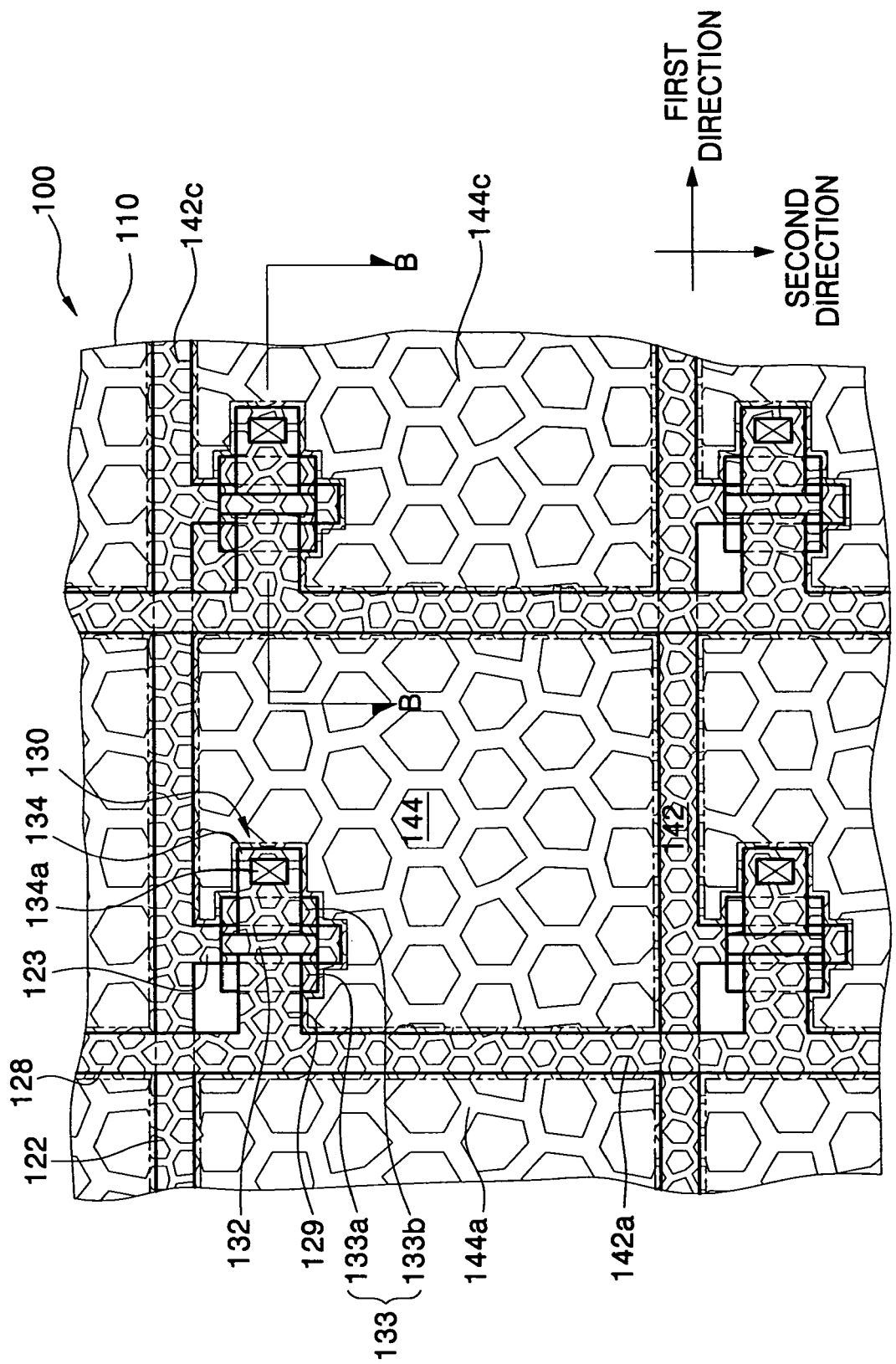
FIG. 5B is a plan view showing another leakage current prevention pattern and a luminance-increasing pattern according to a first exemplary embodiment of the present invention.
Figure 6:
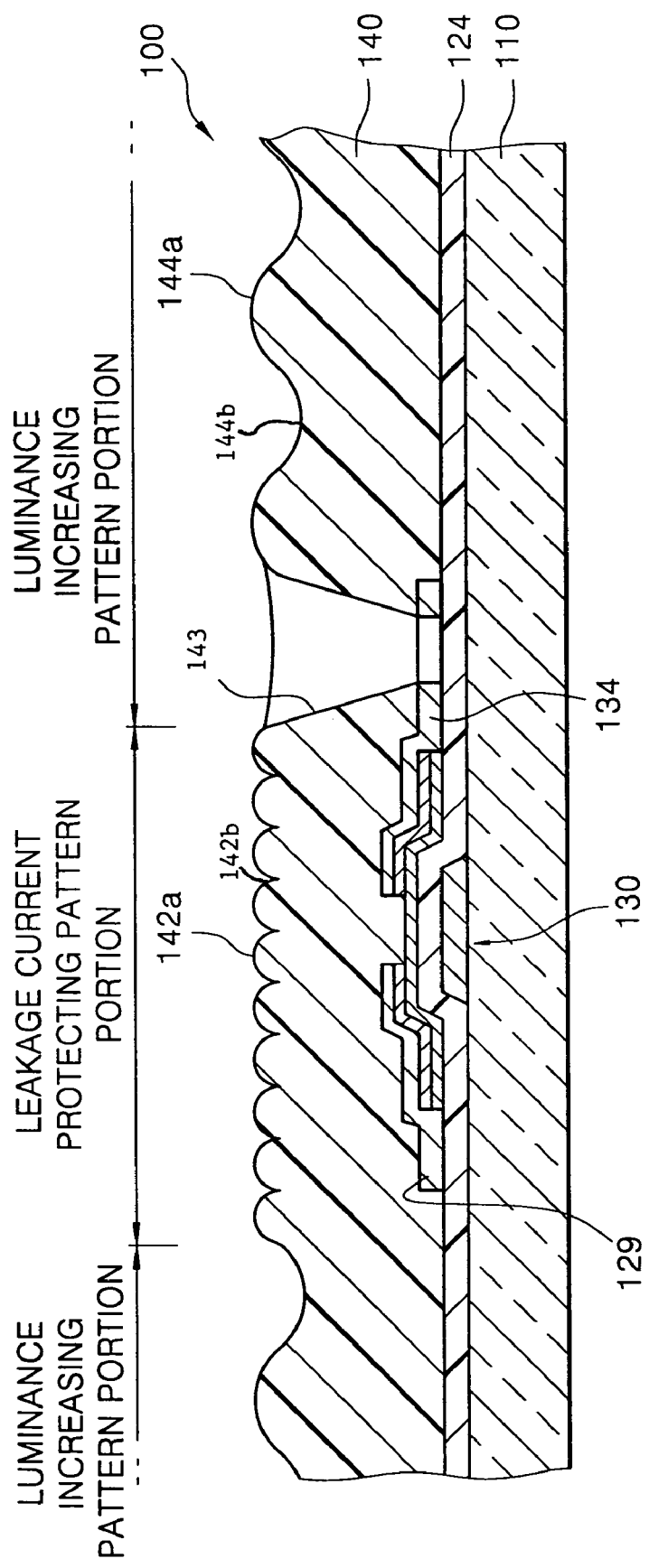
FIG. 6 is a cross sectional view taken along the line B—B of FIG. 5A.

FIG. 5A is a plan view showing a first pattern 142 and a second pattern 144 according to a first exemplary embodiment of the present invention, and FIG. 6 is a cross sectional view taken along the line B—B of FIG. 5A.

Referring to FIGS. 5A and 6, a dielectric layer 140 is formed on the surface of the first substrate 110 for insulating the signal lines 120 and the TFTs 130 from a first electrode 150 (see FIG. 2). In an exemplary embodiment, the dielectric layer 140 is formed by first using a method such as spin coating, and then patterning the substantially flat surface to achieve the desired surface pattern. The surface pattern serves to reflect or defract incident light in a desired direction, which is usually the direction from which the display device is squarely viewed.

The dielectric layer 140 is patterned to form a second contact hole 143 that extends through the dielectric material, a first pattern 142 for preventing a leakage current, and a second pattern 144 for increasing the display device luminance. The second contact hole 143 is connected to the first contact hole 134a of the drain electrode 134, together forming a contact hole of the LCD device. The drain electrode 134 and the first electrode 150 can be electrically coupled to each other through the contact hole 143.

A first pattern 142, herein also referred to as a "leakage current prevention pattern," is formed in a first region 142c of the dielectric layer 140, and a second pattern 144, herein also referred to as "a luminance-increasing pattern," is formed in a second region 144c of the dielectric layer 140. The second region 144c is shown enclosed by the broken lines in FIG. 5A. The areas outside of the broken lines constitute the first region 142c. A person of ordinary skill in the art will understand that the region around the contact hole 143 (herein referred to as the "contact hole region") will have a pattern that is neither the first pattern 142 nor the second pattern 144 to accommodate the presence of the contact hole 143.

The first region 142c is a portion of the dielectric layer 140 overlying the signal lines 120 through which electrical signals are transmitted, and the second region 144c is the portion of the dielectric layer 140 overlying the gate insulating layer 124 that is not covered with electrically conductive layers. More specifically, the first region 142c is a portion of the dielectric layer 140 corresponding to the first signal lines 122, the second signal lines 128, and TFTs 130. The second region 144c is the remaining portion of the dielectric layer 140. Thus, the first signal lines 122, the second signal lines 128, and TFTs 130 substantially outline the boundaries of the second region 144c.

A region near the edge of the first electrode 150 (see FIG. 2) overlies the first signal lines 122, the second signal lines 128, and the TFTs 130. The parasitic capacitance that forms between the first electrode and the signal lines 122, 128 is inversely proportional to the distance between the first electrode 150 and the first signal lines 122, 128. Likewise, the parasitic capacitance between the first electrode 150 and the TFT 130 is inversely proportional to the distance between the first electrode 150 and the TFT 130. Thus, the dielectric layer may have a mean thickness in a range from about 1.5 to about 1.7 µm to reduce the parasitic capacitance. However, as stated above, this thickening of the dielectric layer has undesirable consequences, such as complications in contact hole formation and decreased light transmission efficiency.

According to the present invention, a plurality of first bumpy portions 142a is formed in the first region 142c for both reducing the parasitic capacitance and uniformly distributing the light. For example, each of the first bumpy portions 142a may have a hemispherical shape with a diameter of from about 5 µm to about 7 µm and a height of about 0.3 µm to about 0.5 µm. The mean thickness in the first region 142c of the dielectric layer 140 is in a range from 1.5 µm to about 1.7 µm. In another embodiment, each of the first bumpy portions 142a may be formed into a polygonal shape such as a polygonal cylinder or a polygonal cone having a polygonal cross section, as shown in FIG. 5B. The polygonal bumpy portion has a diagonal length of about 5 µm to about 7 µm in a polygonal cross section and a height of about 0.3 µm to about 0.5 µm. The mean thickness in the first region 142c of the dielectric layer 140 is also in a range between about 1.5 µm and about 1.7 µm. A width of a dip portion 142b between two neighboring first bumpy portions 142a is about 5 µm to about 7 µm. The first bump may have any shape besides the hemispherical shape and the polygonal shape, as would be known to one of the ordinary skill in the art.

Since electrical signals are not transmitted in the area under the second region 144c, no parasitic capacitor is formed in the second region 144c. Therefore, the second pattern 144, rather than the first pattern 142, is formed in the second region 144c. Most of the light for displaying an image is provided through the second pattern 144 that is designed to enhance light transmission. Therefore, the second pattern 144 significantly affects the reflectance and luminance, and ultimately the display quality, of the LCD device.

In general, the amount of light that is transmitted through a layer is inversely proportional to the thickness of the layer. As stated above, however, thick layers are desirable for reducing parasitic capacitance. Therefore, thus far, LCD device design entailed a compromise between maximizing light transmission and reducing parasitic capacitance. The invention achieves high light transmission and reduces parasitic capacitance by forming two different patterns in different regions of the dielectric layer 140. The two different patterns are preferably selected to result in two different mean thicknesses, so that the pattern with a higher mean thickness can be formed in the region(s) where parasitic capacitance is likely to form and the pattern with a lower mean thickness can be formed in the region(s) where light transmission occurs. The mean thickness of a layer is determined by a ratio of the bumpy portions and the dip portions of a pattern.

In the embodiment shown, the first pattern 142 has a higher mean thickness than the second pattern 144. Since parasitic capacitance is likely to form in the first region 142c, which is located above the TFT 130, the first pattern 142 is formed in the first region 142c. As for the second region 144c, the second pattern 144 is formed thereon since a thinner dielectric layer is desirable for enhanced light transmission.

In an exemplary embodiment, each of the second bumpy portions 144a is formed into a hemispherical shape having a diameter in a range from about 10 µm to about 15 µm and a height in a range from about 0.8 µm to about 1.5 µm. As a result, the second bumpy portions 144a are larger than the first bumpy portions 142a. Therefore, the mean thickness of the dielectric layer 140 is in a range from about 0.8 µm to about 1.2 µm due to the second bumpy portions 144a, so that the dielectric layer 140 of the second pattern 144 has a mean thickness lower than the mean thickness of the dielectric layer 140 of the first pattern 142. As shown, the diameter of the second bumpy portion 144a is greater than the diameter of the first bumpy portion 142a. However, the diameter of the second dip portion 144b is greater than the diameter of the first dip portion 142b by an even greater amount than the difference between the diameter of the bumpy portions 142a and 144a. As a result, a greater percentage of the first region 142c is covered with bumpy portions than the second region 144c, and the mean thickness of the dielectric layer 140 corresponding to the second pattern 144 is lowered to enhance light transmission.

In another embodiment, each of the second bumpy portions 144a may be formed into a structure having a polygonal cross section. For example, the bumpy portions may have a polygonal shape such as a polygonal cylinder or a polygonal cone, as shown in FIG. 5B. The polygonal convex portion 144a has a diagonal length of about 10 µm to 15 µm and a height of about 0.8 µm to 1.5 µm. The mean thickness in the second region 144c of the dielectric layer 140 is in a range from about 0.8 µm to about 1.2 µm. A width of a dip portion between the second bumpy portions 144a is in a range from about 5 µm to about 7 µm. The polygonal cross section can be adopted for the first bumpy portions 142 as well.

The first bumpy portion 144a could have any shape besides the hemispherical shape and the polygonal shape disclosed herein, as would be apparent to one of the ordinary skill in the art. In one embodiment, the bumpy portions of the pattern are arranged regularly, i.e. at a constant frequency, so that each of the bumpy portions is spaced apart from a neighboring bumpy portion by a predetermined distance. In another embodiment, the pattern is irregular and the distance between bumpy portions vary within one patterned region.

Figure 7:
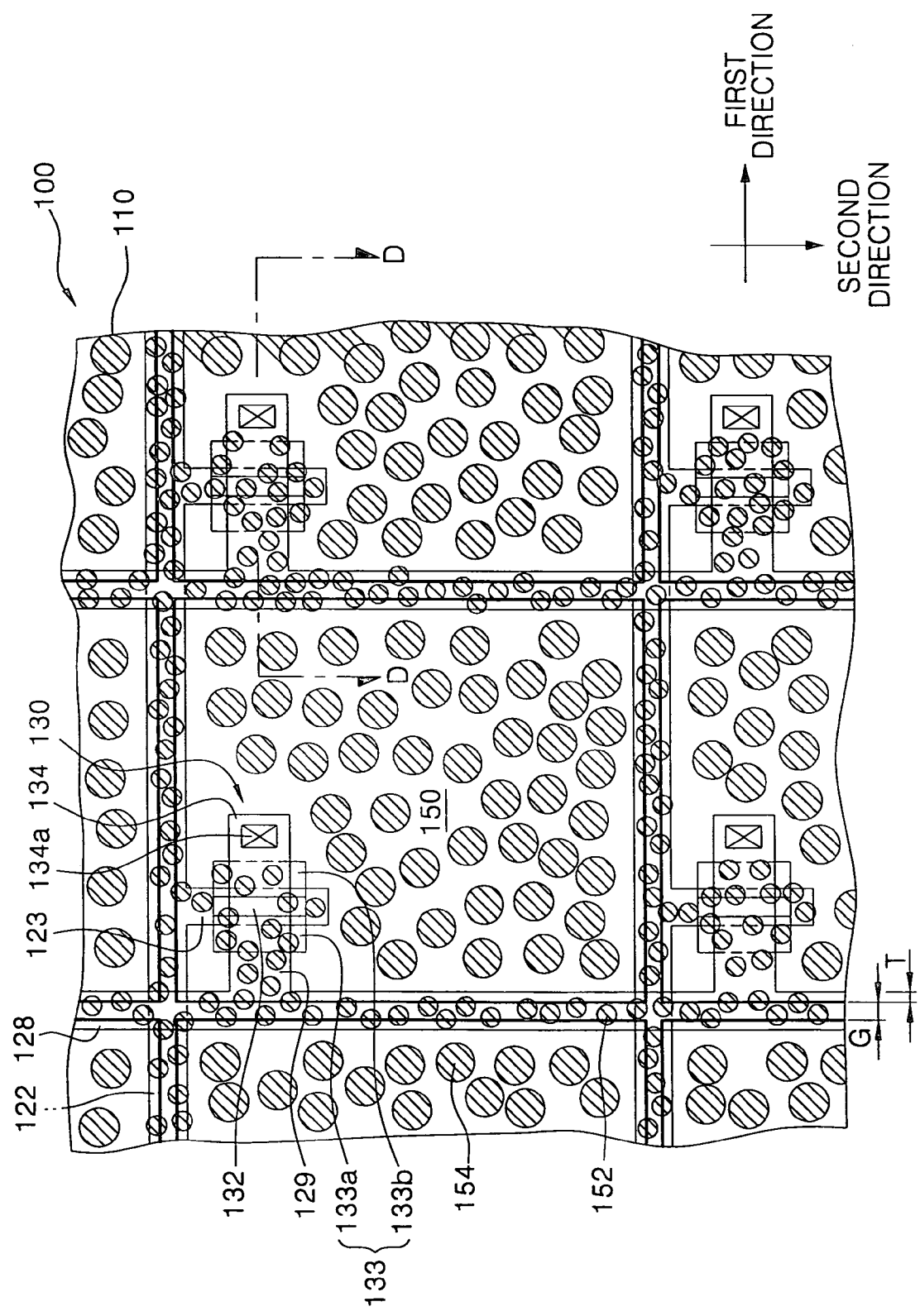
FIG. 7 is a plan view showing a first electrode shown in FIG. 2.

FIG. 7 is a plan view of the first electrode 150 shown in FIG. 2. As shown, the first electrode 150 is formed on a surface of the dielectric layer 140. Examples of materials that may be used in the first electrode 150 include aluminum and an aluminum alloy. The first electrode 150 is positioned to fit with the TFTs 130 on the surface of the dielectric layer 140. Since the TFTs 130 of the present embodiment is arranged in a matrix configuration, the first electrode 150 is also arranged in a similar matrix configuration.

In one embodiment, a portion of the first electrode 150 near the boundaries of the pixel 112 overlies a portion of the first signal lines 122 and a portion of the second signal lines 128 to maximize the surface area of the reflective first electrode 150. A reference letter T in FIG. 7 denotes a width of the overlapping portion that includes both the first electrode 150 and at least one of the first and second signal lines 122, 128. The overlapping portion of the first electrode 150 may have a width T in a range of from about 1 to about 3 µm. A gap of a distance G, where there is no reflective electrode surface, may be have a width of between about 2 and about 4 µm. The smaller the gap G is, the larger is the reflective surface area of the first electrode 150, and greater is the reflective efficiency. The greater the reflective surface area, the higher is the quality and luminance of the LCD display.

In an alternative embodiment, the first electrode 150 covers the first signal lines 122 and the second signal lines 128 (i.e., G=0). Since the first pattern 142 is formed on the first signal lines 122 and the second signal lines 128, the parasitic capacitance can be sufficiently reduced even though the first electrode 150 is disposed over the first and second signal lines 122 and 128.

The surface of the first electrode 150 has a pattern that is similar to that of the dielectric layer 140 since the first electrode 150 is deposited via sputtering or chemical vapor deposition (CVD). A first protruding portion 152 is formed on a first region of the first electrode 150 the first pattern 142, and a second protruding portion 154 is formed on a second region of the first electrode 150. The first and second protruding portions 152 and 154 have a similar shape as the first and second bumpy portions 142a and 144a. Like the first and the second bumpy portions 142a and 144a, the first and the second protruding portion 152 and 154 may have the hemispheric shape, a polygonal shape, or any other shape.

Referring again to FIG. 2, the above-described first member 100 is assembled with a second member positioned substantially parallel to the first member 100, and the liquid crystal layer 300 is provided between the first and second member 100 and 200.

According to an exemplary embodiment of the LCD device, the parasitic capacitance between the signal lines and the electrode and between the TFT and the electrode can be reduced by forming a plurality of bumpy portions on a surface of the dielectric layer, thereby preventing display quality degrade. In addition, the luminance of the LCD device can be improved by decreasing the thickness of the dielectric layer.

Embodiment 2

Figure 8:
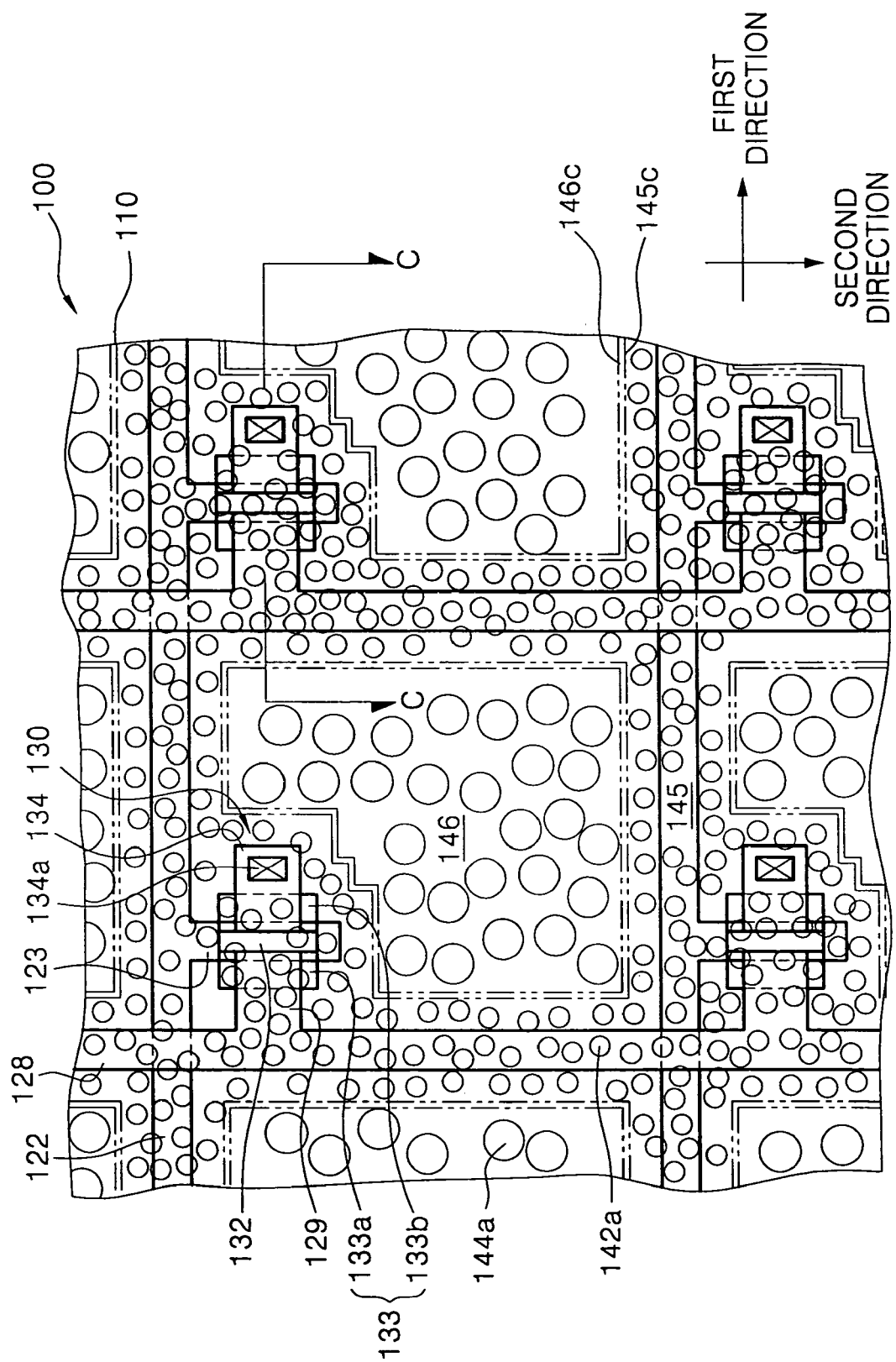
FIG. 8 is a conceptual view showing a first member of an LCD device according to a second exemplary embodiment of the present invention.
Figure 9:
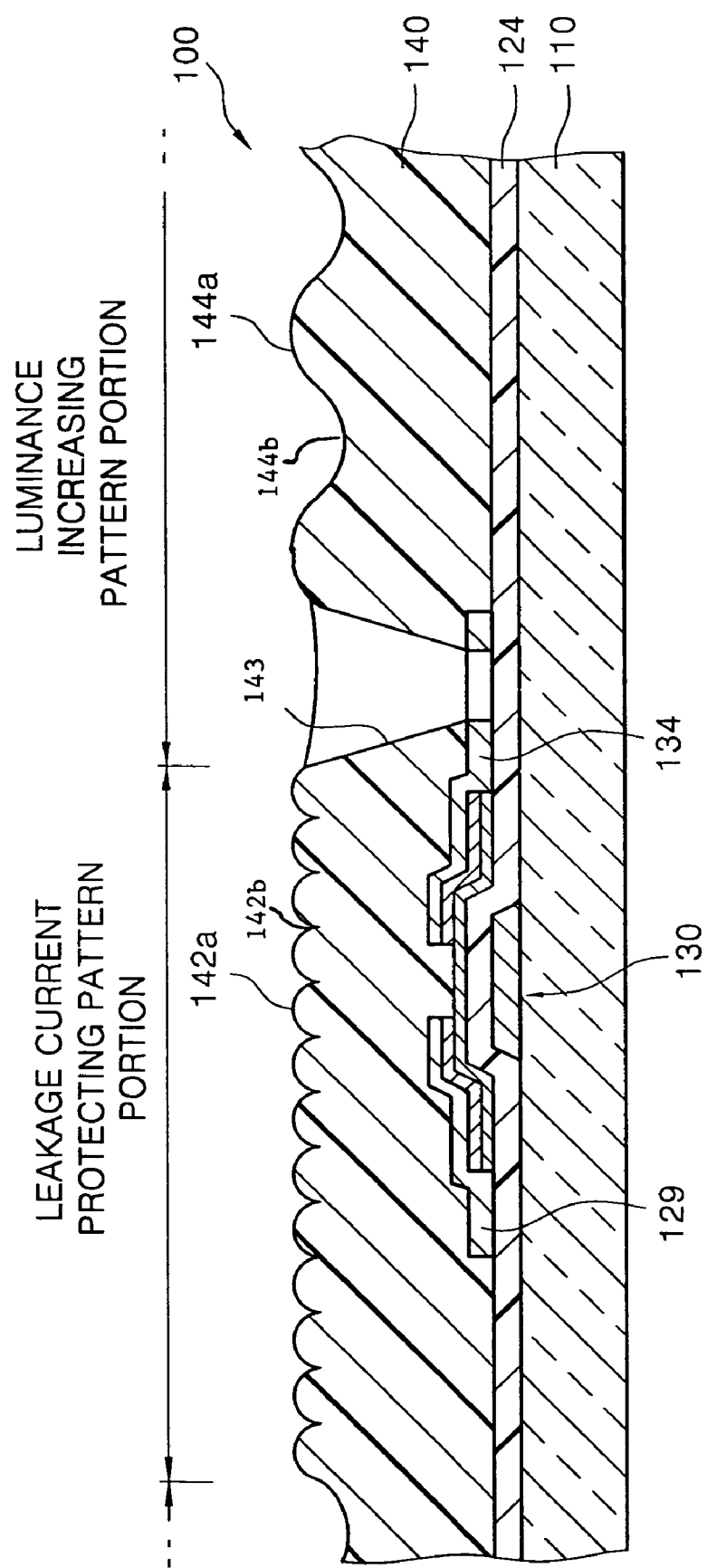
FIG. 9 is a cross sectional view taken along the line C—C of the first member shown in FIG. 8.

FIG. 8 is a conceptual depiction of a first member of an LCD device according to a second exemplary embodiment of the present invention, and FIG. 9 is a cross sectional view taken along the line C—C of the first member shown in FIG. 8.

The second embodiment of the present invention has the same elements as in the first embodiment of the present invention except for the dielectric layer, and thus any further descriptions concerning the same elements will be omitted.

Referring to FIG. 8 and FIG. 9, the surface areas of a first region having the first pattern 145 and the second region having the second pattern 146 affect the parasitic capacitance and luminance of the LCD device. In more detail, when the surface area of the second region having the second pattern 146 is decreased and the surface area of the first region having the first pattern 145 is increased, the parasitic capacitance between the first signal lines 122 and the first electrode 150 or between the second signal lines 122 and the first electrode 150 is greatly reduced.

In an exemplary embodiment, the boundaries between the first region and the second region are located further away from the signal lines 122, 128 and the TFT 130 than in the first embodiment. For example, the boundaries may be located about 10 µm to about 30 µm away from each of the first signal lines, the second signal lines, and the TFTs. The first pattern 145 includes a plurality of first bumpy portions 142a and the second pattern includes a plurality of second bumpy portions 144a.

Accordingly, the parasitic capacitance can be greatly reduced by enlarging the surface area of the leakage current prevention pattern 145 to thereby prevent display failure.

Exemplary Methods of Manufacturing an LCD Device

Figure 10:
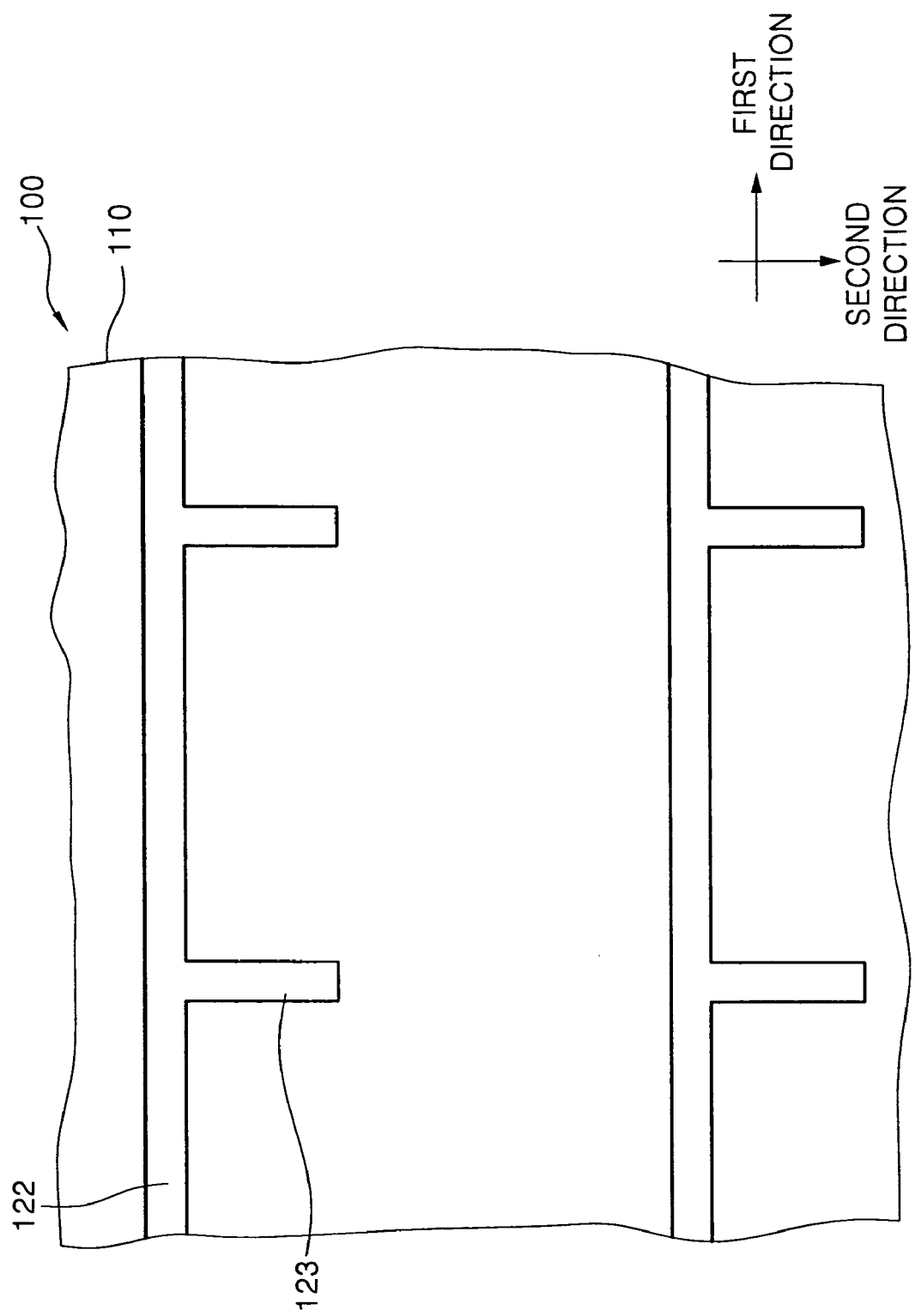
FIG. 10 is a view showing a first signal line and a gate electrode formed on a first member of the LCD device according to an exemplary embodiment of the present invention.
Figure 11:
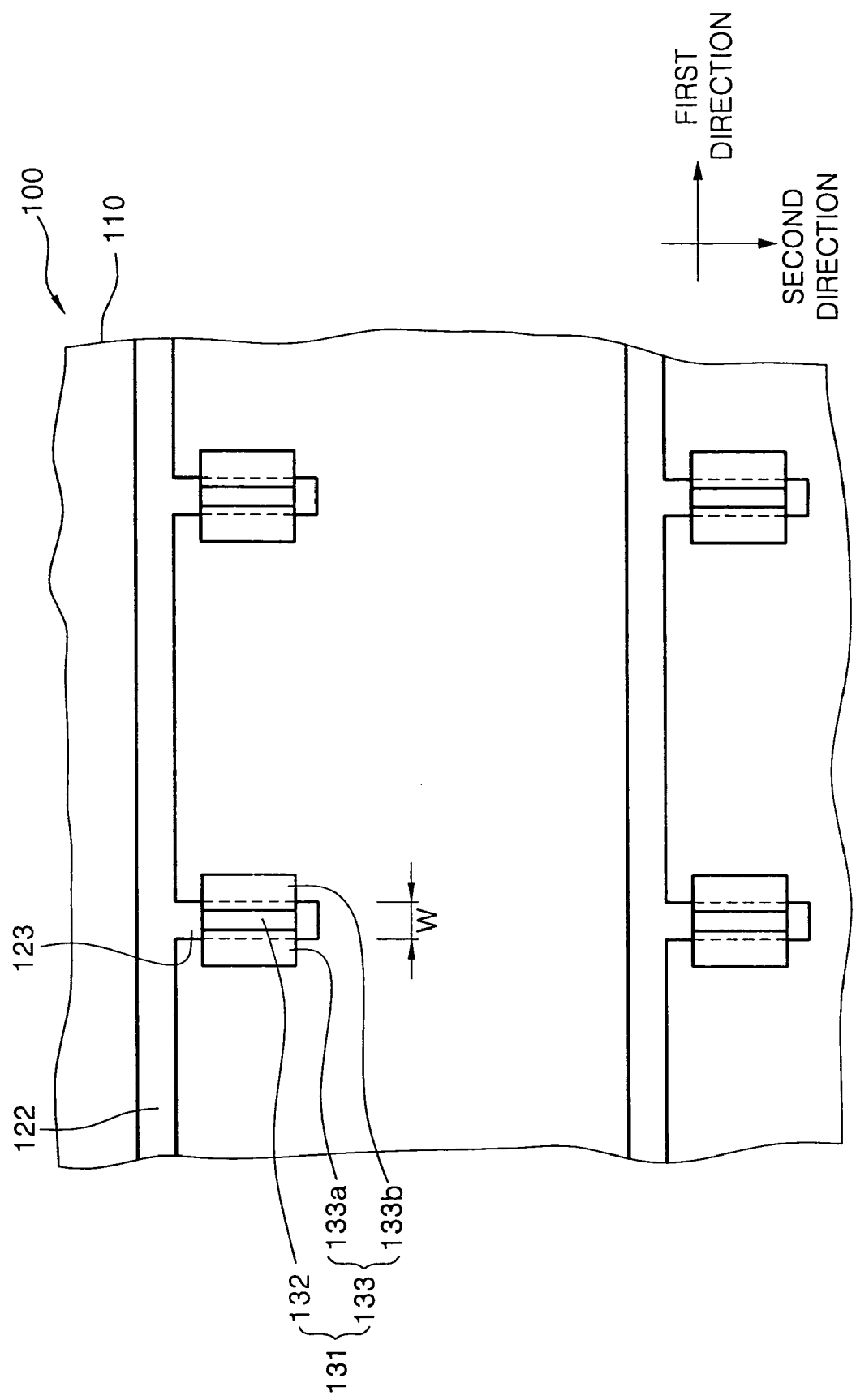
FIG. 11 is a view showing a channel layer formed on a first member according to an exemplary embodiment of the present invention.

Exemplary methods of manufacturing the present invention now will be described with reference to the accompanying drawings. FIGS. 10–12 are views showing different stages of a process for manufacturing the LCD device according to an exemplary embodiment of the present invention.

First, signal lines 122 and gate electrodes 123 are formed on a surface of the first substrate 110 as shown in FIG. 10. FIG. 10 is a view showing a partially formed version of the first member 100 on which a plurality of first signal lines 122 and a plurality of gate electrodes 123 are formed.

A metal is deposited on the whole surface of a first substrate 110 to thereby form a metal layer on the first substrate 110. Examples of the metal layer include an aluminum layer, an aluminum alloy layer, etc. Subsequently, a photoresist film is deposited on the metal layer and patterned through an exposure process using a photomask. The metal layer may be patterned using the photoresist pattern, forming a plurality of first signal lines 122 in a first direction on the metal layer. Each of the first signal lines 122 extends at different points thereof in a second direction, to thereby form a plurality of gate electrodes 123. A transparent insulating layer is deposited on the first signal lines 122 after forming the first signal lines 122.

Next, a channel layer is formed on the first member as shown in FIG. 11. FIG. 11 is a view showing a channel layer formed on a first member 100.

After depositing the insulating layer, an amorphous silicon layer and an n$^+$ amorphous silicon layer are subsequently deposited on the first substrate 110 on which the first signal lines 122, the gate electrodes 123, and the insulating layer have been deposited. Then, the amorphous silicon layer and the n$^+$ amorphous silicon layer are patterned using the photoresist pattern and the pattern mask to form a channel layer 131 including a lower channel 132 and an upper channel 133.

The lower channel 132 is positioned on the gate electrode 123, and has a width larger than the width W of the corresponding gate electrode 123. The lower channel 132 is conductive when a signal voltage is applied to the gate electrode 123, and is non-conductive when the signal voltage is broken off from the gate electrode 123. The upper channel 133 is formed on the lower channel 132 and includes a first sub-channel 133a and a second sub-channel 133b.

Then, a plurality of second signal lines, source electrodes and drain electrodes are formed on the first member as shown in FIG. 12. FIG. 12 is a view showing a plurality of second signal lines, source electrodes, and drain electrodes formed on the first member.

A metal is deposited on the whole surface of the first substrate 110, to thereby form a metal layer on the first substrate 110. Examples of suitable metal include aluminum, aluminum alloy, etc. as shown in FIG. 12. Subsequently, a photoresist film is coated on the metal layer, and then patterned through exposure and development processes using a photomask. The metal layer is patterned using the photoresist pattern so that a plurality of second signal lines 128 are formed in the second direction on the metal layer. Each of the second signal lines 128 extends in the first direction from a unique point on the metal layer, thereby forming. a plurality of source electrodes 129 and drain electrodes 134. The source electrode 129 makes contact with the first sub-channel 133a, and the drain electrode 134 makes contact with the second sub-channel 133b. A first contact hole 134a is also formed on the drain electrode 134. A TFT comprises a gate electrode 123, a source electrode 129, a channel layer, and a drain electrode 134.

Hereinafter, the process for forming the dielectric layer and the first electrode is explained with reference to FIG. 5A and the attached drawings.

Referring to FIG. 5A and FIG. 5B, the dielectric layer 140 is deposited on the whole surface of the first substrate 110 to thereby cover all the second signal lines 128, source electrodes 129, and the drain electrodes 134. The dielectric layer 140 electrically insulates the first signal lines, the second signal lines, and the first electrode from each other. The dielectric layer 140 is patterned to form the first pattern 144, the second pattern 142, and a second contact hole 143 (see FIG. 9).

In more detail, the dielectric layer 140 is divided into a first region on which the leakage current prevention pattern (the first pattern 142) is formed and a second region on which the luminance-increasing pattern (the second pattern 144) is formed. The first region is located on the first and second signal lines 122 and 128, the source electrodes 129, and the drain electrodes 134. The second region is the remaining portion of the dielectric layer that is not part of the first region. The dielectric layer 140 is patterned such that the mean thickness of the first region is smaller than the mean thickness of the second region.

As an embodiment, the leakage current prevention pattern may be formed into a hemispherical shape having a diameter of about 5 µm to about 7 µm and a height of about 0.3 µm to about 0.5 µm, or a polygonal shape having a diagonal length of about 5 µm to about 7 µm and a height of about 0.3 µm to about 0.5 µm. The mean thickness of the first region is in a range of about 1.5 to about 1.7 µm. The leakage first pattern 142 may also have any shape besides the hemispheric and the polygonal shape, as would be apparent to one of the ordinary skill in the art.

Meanwhile, the second pattern 144 may be formed into a hemispherical shape having a diameter of about 10 µm to about 15 µm and a height of about 0.8 µm to about 1.5 µm, or a polygonal shape such as a polygonal cylinder or a polygonal cone. The polygonal shape has a diagonal length of about 10 µm to about 15 µm in a diagonal cross sectional surface and a height of about 0.8 µm to about 1.5 µm. For example, the mean thickness of the second region is in a range of about 0.8 to about 1.2 µm. The first pattern may also have any shape besides the hemispherical shape and the polygonal shape, as would be apparent to one of the ordinary skill in the art. The second contact hole 143 is formed so as to expose the drain electrode 134 of the TFT 130 while the dielectric layer 140 is patterned.

A metal is deposited on the surface of the dielectric layer 140 to form a metal layer on the dielectric layer 140 with a matrix shape. Therefore, the first electrode 150 is formed on a surface of the dielectric layer 140, as shown in FIG. 7. The height of the first electrode 150 varies according to the height of the corresponding dielectric layer, so that the mean height of the first electrode 150 in the first region is greater than the mean height of the first electrode 150 in the second region. In addition, the first electrode 150 has a plurality of protruding portions 152 for sufficiently reflecting light. The protruding portion of the first electrode 150 in the first region is also formed to be larger than the protruding portion of the first electrode 150 in the second region.

A second electrode 220 is formed on a whole surface of a second transparent substrate 210 that is coupled to the first electrode 150, as shown in FIG. 2. A color filter 230 may be further disposed between the second electrode 220 and the second transparent substrate 210.

The first member 100 and the second member 200 are assembled after being aligned with each other. Then, liquid crystal is injected between the first member 100 and the second member 200, thereby completing the LCD device.

Whereas the embodiments of this invention illustrates the reflective type LCD device, the apparatus and method disclosed are not limited to this application and are applicable to all kinds of LCD devices which display an image using a dielectric layer and a reflective electrode. For example, the embodiments of this invention can be applied to a transmissive and reflective type LCD that uses the dielectric layer, the reflective electrode, and the transparent electrode and can display an image regardless of darkness or brightness of displaying place, because the shape of the reflective electrode and the transparent electrode is determined by the shape of the dielectric layer according to the present invention.

Although the exemplary embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A display device comprising:
a first substrate having a first region and a second region;
a dielectric layer deposited on the first and the second regions, wherein the dielectric layer of the first region has a first pattern and the dielectric layer of the second region has a second pattern that is different from the first pattern, the first pattern including first bumpy portions and first dip portions and the second pattern including second bumpy portions and second dip portions, wherein the first bumpy portions have a height of about 0.3 to about 0.5 micron and the second bumpy portions have a height of about 0.8 micron to about 1.5 micron, wherein the height is a difference between a thinnest portion of the dielectric layer and the thickest portion of the dielectric layer in the first region;
a second substrate coupled to the first substrate to form a space between the second substrate and the dielectric layer; and
a liquid crystal layer positioned in the space.

2. The device of claim 1, wherein a mean thickness of the dielectric layer having the second pattern is between about 0.8 micron to about 1.2 micron.

3. The device of claim 1, wherein the portion of the dielectric layer having the first pattern has a mean thickness of about 1.5 micron to about 1.1 micron.

4. The device of claim 1, wherein the first bumpy portions make up a greater portion of the first pattern than the first dip portions.

5. The device of claim 1, wherein the second bumpy portions and the second dip portions make up about equal proportions of the second pattern.

6. The device of claim 1, wherein each of the second bumpy portions is a hemispherical bump having a circular cross section of a diameter between about 10 micron and about 15 micron.

7. The device of claim 1, wherein each of the first bumpy portions is a hemispherically shaped bump having a diameter of about 5 micron to about 7 micron.

8. The device of claim 1 further comprising:
a first electrode deposited on the dielectric layer.

9. The device of claim 8, wherein the first electrode is reflective, and wherein the first electrode is deposited over a part of the signal lines to maximize a reflective surface.

10. The device of claim 8, wherein a portion of the dielectric layer having the first pattern has a higher mean thickness than a portion of the dielectric layer having the second pattern, for reducing parasitic capacitance between the signal lines and the first electrode.

11. The device of claim 10, wherein more light is transmitted through the second pattern than the first pattern, and wherein the second pattern is designed to enhance light transmission.

12. The device of claim 8, wherein the first electrode in the first region and the second region has patterns that are substantially similar to the first pattern and the second pattern, respectively.

13. The device of claim 1, wherein signal lines and transistors are formed on the first region.

14. The display device of claim 1 further comprising a contact hole region, wherein the dielectric layer deposited on the contact hole region has a third pattern that is different from the first pattern and the second pattern, the third pattern accommodating a contact hole that extends through the dielectric layer.

15. A display device comprising:

a first substrate having a first region and a second region;

a dielectric layer deposited on the first and the second regions, wherein the dielectric layer of the first region has a first pattern and the dielectric layer of the second region has a second pattern that is different from the first pattern, the first pattern including first bumpy portions and first dip portions and the second pattern including second bumpy portions and second dip portions, wherein each of the first bumpy portions has a polygonal cross section having a longest diameter of between about 5 micron and about 7 micron and the second bumpy portions have a height of about 0.8 micron to about 1.5 micron, the height being a difference between a thinnest portion of the dielectric layer and the thickest portion of the dielectric layer in the first region;

a second substrate coupled to the first substrate to form a space between the second substrate and the dielectric layer; and a liquid crystal layer positioned in the space.

16. A method of making a light emitting apparatus, the method comprising:

obtaining a first member having a first region and a second region;

forming first signal lines, second signal lines, and transistors in the first region of the first member;

depositing a dielectric layer on the first region and the second region;

patterning the dielectric layer overlying the first region to form a first patterned region;

patterning the dielectric layer overlying the second region to form a second patterned region having a pattern different from the first patterned region;

attaching a second member to the first member to form a space between the second member and the dielectric layer; and depositing a liquid crystal layer in the space;

wherein the first bumpy portions have a height of about 0.3 to about 0.5 micron and the second bumpy portions have a height of about 0.8 micron to about 1.5 micron.

17. The method of claim 16 further comprising patterning the dielectric layer so that a mean thickness of the dielectric layer is higher in the first patterned region than in the second patterned region.

18. The method of claim 16, wherein the first region comprises electrically conductive portions including signal lines and transistors and the second region comprises a light transmitting region.

19. The method of claim 16, wherein the first patterned region has a regular pattern comprising first bumpy portions and first dip portions, wherein the first bumpy portions are separated from one another by a first predetermined distance.

20. The method of claim 19, wherein the second patterned region has a regular pattern comprising second bumpy portions and second dip portions, wherein the second bumpy portions are separated from one another by a second predetermined distance that is different from the first predetermined distance.

* * * * *